(12) United States Patent
Floberg et al.

(10) Patent No.: US 9,930,604 B2
(45) Date of Patent: Mar. 27, 2018

(54) PATH FINDING IN A MESH NETWORK (71) Applicant: Terranet AB, Lund (SE)

(72) Inventors: Henrik Floberg, Lund (SE); Dag Mårtensson, Flyinge (SE)

(73) Assignee: TERRANET AB, Lund (SE)

( * ) Notice: Subject to any disclaimer, the term of this patent is extended or adjusted under 35 U.S.C. 154(b) by 176 days.

(21) Appl. No.: 15/027,570

(22) PCT Filed: Oct. 8, 2014

(86) PCT No.: PCT/EP2014/071564
§ 371 (c)(1),
(2) Date: Apr. 6, 2016

(87) PCT Pub. No.: WO2015/052248
PCT Pub. Date: Apr. 16, 2015

(65) Prior Publication Data
US 2016/0242099 A1    Aug. 18, 2016

(30) Foreign Application Priority Data
Oct. 9, 2013   (SE) .................................. 1351193

(51) Int. Cl.
| H04L 12/28 | (2006.01) |
| H04W 40/12 | (2009.01) |
| H04W 40/08 | (2009.01) |
| H04L 12/26 | (2006.01) |
| H04J 1/16 | (2006.01) |
| H04W 84/18 | (2009.01) |

(52) U.S. Cl.
CPC ............. *H04W 40/12* (2013.01); *H04L 43/16* (2013.01); *H04W 40/08* (2013.01); *H04W 84/18* (2013.01); *Y02B 60/50* (2013.01)

(58) Field of Classification Search
USPC ......................................... 370/252, 329, 238
See application file for complete search history.

(56) References Cited

U.S. PATENT DOCUMENTS

| 8,149,715 B1 | 4/2012 | Goel et al. |
| 2007/0248065 A1 | 10/2007 | Banerjea et al. |

(Continued)

OTHER PUBLICATIONS

International Search Report and Written Opinion of corresponding application No. PCT/EP2014/071564, dated Feb. 5, 2015, all enclosed pages cited.

(Continued)

*Primary Examiner* — John Pezzlo
(74) *Attorney, Agent, or Firm* — McNair Law Firm, P.A.

(57) ABSTRACT

A station (100, 330) for use in a mesh network comprising at least one first station (100*a*) and a second station (100*b*) wherein the station comprises a controller (210) configured to receive a path request for a path from the first station (100*a*) to the second station (100*b*) from a transmitting station (100*a*); determine a proposed path between the first station (100*a*) and the second station (100*b*); and determine a cost for the proposed path. The controller (210) is configured to retrieve a power output level for the transmitting station (100*a*), and to include the battery level in the determination of the cost for the proposed path, wherein an increase in power output level leads to an increase in cost for the proposed path.

21 Claims, 5 Drawing Sheets

(56) References Cited

U.S. PATENT DOCUMENTS

2010/0128696 A1* 5/2010 Fantini .............. H04L 29/12028
370/331
2013/0137378 A1 5/2013 Folden et al.
2014/0269272 A1* 9/2014 Shuey .................... H04L 47/80
370/230

OTHER PUBLICATIONS

Toh, C.K.: "Maximum Battery Life Routing to Support Ubiquitous Mobile Computing in Wireless Ad Hoc Networks", IEEE Communications Magazine, IEEE Service Center, Piscataway, US, vol. 39, No. 6, Jun. 1, 2001, all enclosed pages cited.

Jiageng Li, et al.: "Power-aware Routing Protocols in Ad Hoc Wireless Networks", IEEE Wireless Communications, IEEE Service Center, Piscataway, NJ, US, vol. 12, No. 6, Dec. 1, 2005, all enclosed pages cited.

Jihong Shi, et al.: "AODV Protocol Optimization Based on Cross-Layer Design of WMN", Wireless Communications, Networking and Mobile Computing (WICOM), 2011 7th International Conference on, IEEE, Sep. 23, 2011, all enclosed pages cited.

* cited by examiner

PATH FINDING IN A MESH NETWORK

TECHNICAL FIELD

This application relates to a method, a computer-readable medium and a radio frequency communication network device for use in a mesh network, a so-called station, for improved path finding in a mesh network, and in particular to a method, a computer-readable medium and a station for improved path finding in a mesh network for improved power consumption.

BACKGROUND

In mesh networks, such as networks operating according to the IEEE 802.11s standard, handsets, such as mobile phones, operating as stations in the network often operate in a mesh mode wherein they may act as repeaters for other stations' communications. This drains the battery of the repeating station. The power consumption in mesh mode is less than in active mode, but higher than in standby mode.

A handset running out of power will no longer be able to operate as a repeater which will significantly affect the mesh network architecture and potentially lead to some stations being isolated. It will also lead to an increased risk of interrupted communications.

It is therefore important to reduce the power consumption of a station so that it lasts as long as possible.

It is common that a station tries to provide as high a signal quality as possible by transmitting at a high power output. However, this high power output is often unnecessary as the signal quality received may be adequate and/or there are no other units that are far enough away from the station to actually benefit from the high output. For example a station transmitting at 100 mW allows for a range of about 100 m. However, if the furthest station away is only 50 m away the output power of 100 mW is unnecessarily high and may be reduced. Path loss in free space (for a given frequency) gives that a reduction in output power of 6 dB will give a range reduction by factor 2. For comparison, a transmit power of 100 mW equals +20 dBm and 500 mw equals +27 dBm. The power may thus be reduced by a factor of 4, while only reducing the range by a factor of 2.

Furthermore, transmitting at a too high power output also induces unnecessary interference in the mesh network as well as battery drain. The increased interference will also lead to a decreased network capacity and the battery drain is thus in vain as it is in fact hurting the quality of service in the mesh network, instead of helping it.

There is thus a need for a method and a station that enables for a stable communication network to be maintained and which provides a high quality of service without draining too much battery.

SUMMARY

It is an object of the teachings of this application to overcome the problems listed above. The inventors of this application has realized that by proactively preempting a low battery level by introducing a transmitting power level aspect in a cost function for a path, a solution is provided that also reduces the interference in the mesh network.

It is thus one object of the teachings herein to provide a station for use in a mesh network comprising at least one first station and a second station wherein the station comprises a controller configured to receive a path request for a path from the first station to the second station from a transmitting station; determine a proposed path between the first station and the second station; and determining a cost for the proposed path. The controller is characterized in that it is configured to retrieve a power output level for the transmitting station, and to include the battery level in the determination of the cost for the proposed path, wherein an increase in power output level leads to an increase in cost for the proposed path.

It is also an object of the teachings of this application to overcome the problems listed above by providing a mesh network comprising a station as above.

It is also an object of the teachings of this application to overcome the problems listed above by providing a method for use in a station for use in a mesh network comprising at least one first station and a second station wherein the method comprises receiving a path request for a path from the first station to the second station from a transmitting station; determining a proposed path between the first station and the second station; and determining a cost for the proposed path. The method being characterized in that it comprises retrieving power output level for the transmitting station, and to include the battery level in the determination of the cost for the proposed path, wherein an increase in power output level leads to an increase in cost for the proposed path.

It is also an object of the teachings of this application to overcome the problems listed above by providing a receiving station for use in a mesh network also comprising at least one transmitting station, wherein the receiving station comprises a controller configured to: receive a receive signal from the transmitting station; and determine a received signal strength of the signal, wherein the controller is characterized in that it is configured to determine that the received signal strength is below a second threshold level ($RSSI_t+D1$), and if so, signal for a path request to avoid the signal falling below a first threshold level ($RSSI_t$) thereby avoiding a break in the connection.

It is also an object of the teachings of this application to overcome the problems listed above by providing a method for use in a receiving station for use in a mesh network also comprising at least one transmitting station, wherein the method comprises: receiving a receive signal from the transmitting station; and determining a received signal strength of the signal, wherein the method is characterized in that it comprises determining that the received signal strength is below a second threshold level ($RSSI_t+D1$), and if so signal for a path request to avoid the signal falling below a first threshold level ($RSSI_t$) thereby avoiding a break in the connection.

It is also an object of the teachings of this application to overcome the problems listed above by providing a computer readable storage medium encoded with instructions that, when executed on a processor, performs the methods according to above.

The teachings herein also find use in routed mesh networks operating according to the IEEE 802.11s standard. Other examples are WPANs (wireless personal area network) that build on the IEEE 802.15 standard and especially the IEEE 802.15.5 WPAN mesh standard.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
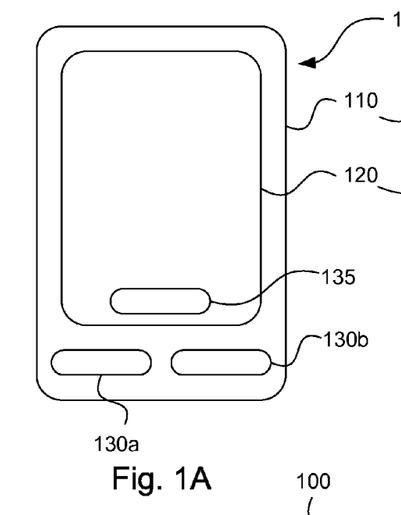
FIG. 1 is a schematic view of a station according to an embodiment of the teachings herein.
Figure 1B:
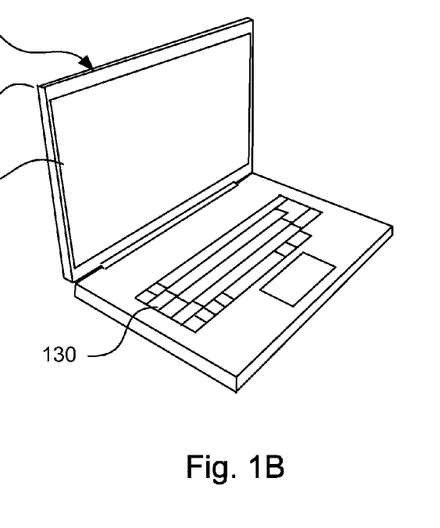

FIGS. 1A and 1B generally show a station 100 according to an embodiment herein. In one embodiment the station 100 is configured for wireless or radio frequency network communication for acting as a node in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1A and a laptop computer 100 in FIG. 1B.

Referring to FIG. 1A a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of input units are computer mouse, touch pads, touch screens or joysticks to name a few.

Figure 2:
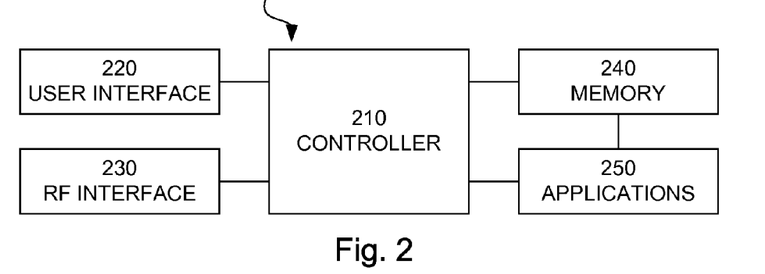
FIG. 2 is a schematic view of the components of a station according to an embodiment of the teachings herein.

FIG. 2 shows a schematic view of the general structure of a station according to FIGS. 1A and 1B. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1A and 1B is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11s and Bluetooth® to name a few. Other examples of radio technologies for example for communicating with devices outside the mesh network that may be implemented in a station 100 are W-CDMA, GSM, UTRAN, LTE, NMT to name a few.

Figure 3:
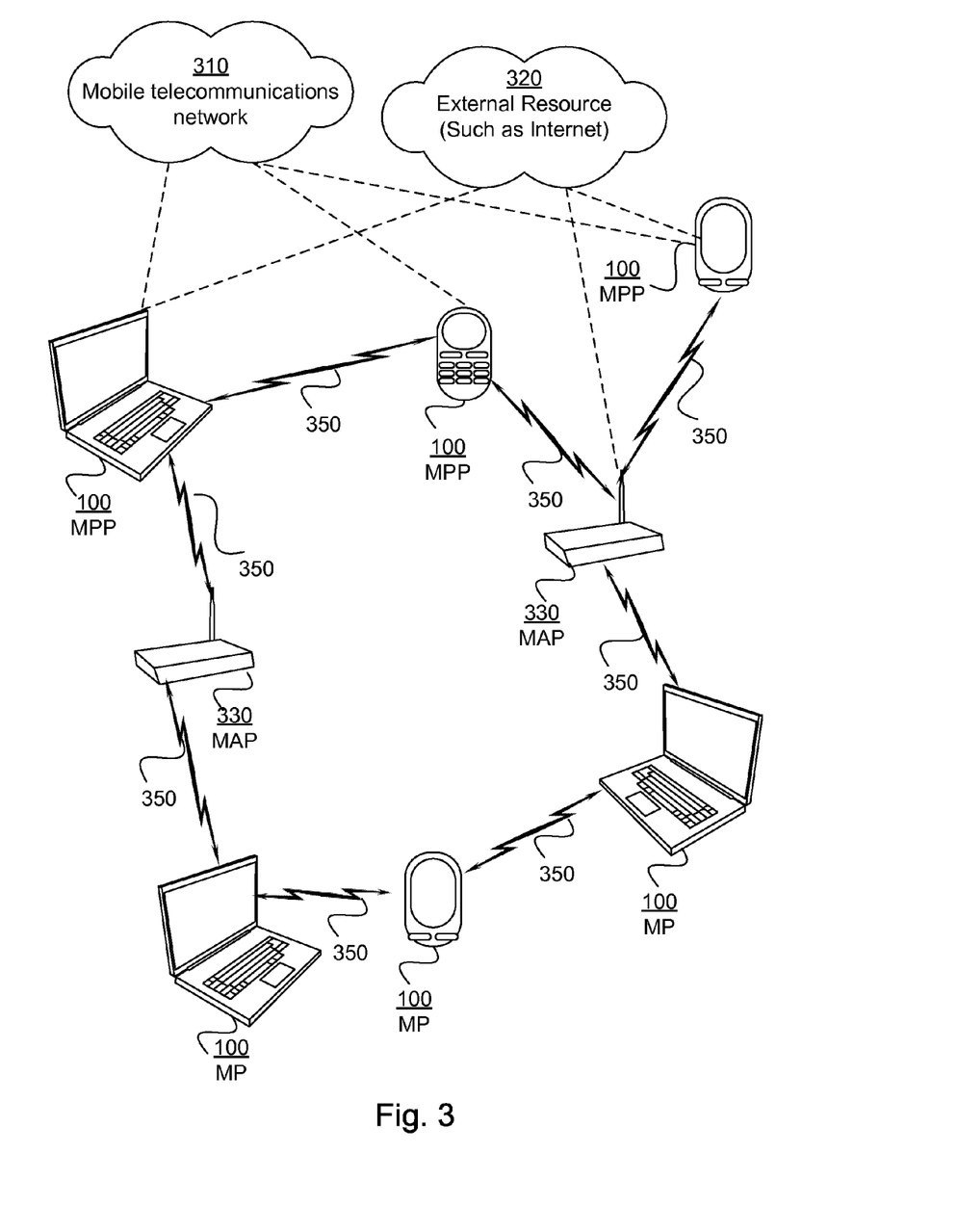
FIG. 3 is a schematic view of a general view of a mesh network according to an embodiment of the teachings herein.

FIG. 3 shows a mesh network 300. A mesh network 300 comprises a plurality of nodes which may be a station 100 as in FIGS. 1A, 1B and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11s standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1A and 1B, and supports a peer protocol for discovering neighboring nodes and maintaining an overview of them. In IEEE 802.11s this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 100 in a mesh network receive this information and each node 330, 100 is thus aware of its surrounding network environment.

The MPs also support a protocol for communicating with other nodes, nodes that are not necessarily neighbors to the MP. In IEEE 802.11s this peer protocol is called Hybrid Wireless Mesh Protocol (HWMP). It is hybrid because it supports two kinds of path selection protocols. In IEEE 802.11s the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11s should a path be broken this will be discovered after a time period (5 s) when a sending node detects that reception is not acknowledged. The system then performs a rerouting procedure by sending out path requests (PREQ).

The self-healing capability enables a routing-based network to operate when one node breaks down or a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

Figure 4:
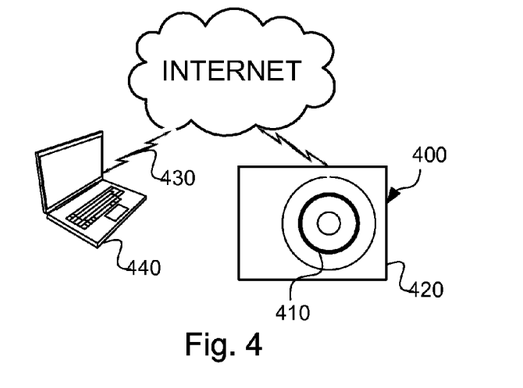
FIG. 4 is a schematic view of a computer-readable storage medium according to an embodiment of the teachings herein.

FIG. 4 shows a schematic view of a computer-readable medium as described in the above. The computer-readable medium 400 is in this embodiment a data disc 400. In one embodiment the data disc 400 is a magnetic data storage disc. The data disc 400 is configured to carry instructions 410 that when loaded into a controller, such as a processor, executes a method or procedure according to the embodiments disclosed above. The data disc 400 is arranged to be connected to or within and read by a reading device 420, for loading the instructions into the controller. One such example of a reading device 420 in combination with one (or several) data disc(s) 400 is a hard drive. It should be noted that the computer-readable medium can also be other mediums such as compact discs, digital video discs, flash memories or other memory technologies commonly used.

The instructions 410 may also be downloaded to a computer data reading device 440, such as a computer or other device capable of reading computer coded data on a computer-readable medium, by comprising the instructions 410 in a computer-readable signal 430 which is transmitted via a wireless (or wired) interface (for example via the Internet) to the computer data reading device 440 for loading the instructions 410 into a controller. In such an embodiment the computer-readable signal 43 is one type of a computer-readable medium 400.

The instructions may be stored in a memory (not shown explicitly in FIG. 4, but referenced 240 in FIG. 2) of the computer 440.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the description below there will not be made any distinction between which component of a mesh point or a station that performs which action. As would be apparent to a person skilled in data stations some tasks may be implemented to be performed by several different components and to list all the possible alternatives would only serve to cloud the issues at hand.

Figure 5A:
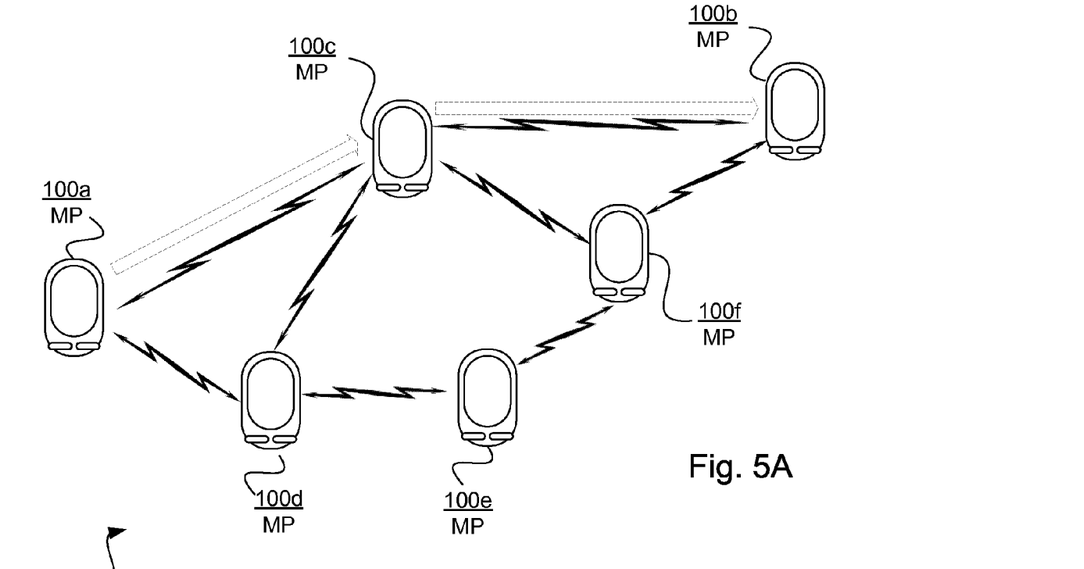
FIGS. 5A, and 5B each shows an example of an example mesh network according to an embodiment of the teachings herein.

FIG. 5A shows a mesh network 500 comprising six stations 100a, 100b, 100c, 100d, 100e and 100f, which may be implemented as a station 100 of FIG. 1A (or 1B). The stations are connected via a wireless link (indicated by dashed arrows) to each other and are, in one embodiment, arranged to operate according to the wireless communication standard IEEE802.11s. Other standards that the stations 100a-f may be arranged to operate according to are WPANs (wireless personal area network) that build on the IEEE 802.15 standard and especially the IEEE 802.15.5 WPAN mesh standard.

A first station 100a is connected to a second station 100b through a path hopping from one station to another in the mesh network of FIG. 5A. In the example of FIG. 5A the path from the first station 100a to the second station 100b goes through a third station 100c. The path is indicated by the dashed arrows.

As a path is to be determined, such as when a new station has entered the mesh network, a station has been removed from the network or when a link is otherwise broken, a path request message is sent out by the first station 100a for finding a path to the second station 100b. As should be clear, any station in the network 500 may perform such a path request. The path requests are forwarded by intermediate stations until a path to the second station 100b has been found. A path response message is then sent along the path to the first station 100a.

To determine which path to be used a cost function may be used which takes into account various factors such as available bandwidth of an intermediate node or station. In one embodiment, the cost of the path so far is propagated along with the path request and as an intermediate station receives the path request, it determines its own cost and adds this to the propagated cost and forwards the cost along with the path request.

One example is a cost function which takes into account a number of different parameters such as bit rate, RSSI value, latency, jitter and packet loss. The cost function for a mesh link between handset nodes A and B can be expressed as $$C_{AB} = \sum_i c_i * f_i(x^i_{AB})$$

which is the weighted sum of the individual metric functions, $c_i$ being the weights, $f_i$ being the metric functions and $x^i_{AB}$ being a path relevant parameter. Examples of such metric functions are known in the art and will not be discussed further herein.

The cost function is normalized if the individual metric functions $f_i$ are normalized and $$\sum_i c_i = 1$$

Figure 5B:
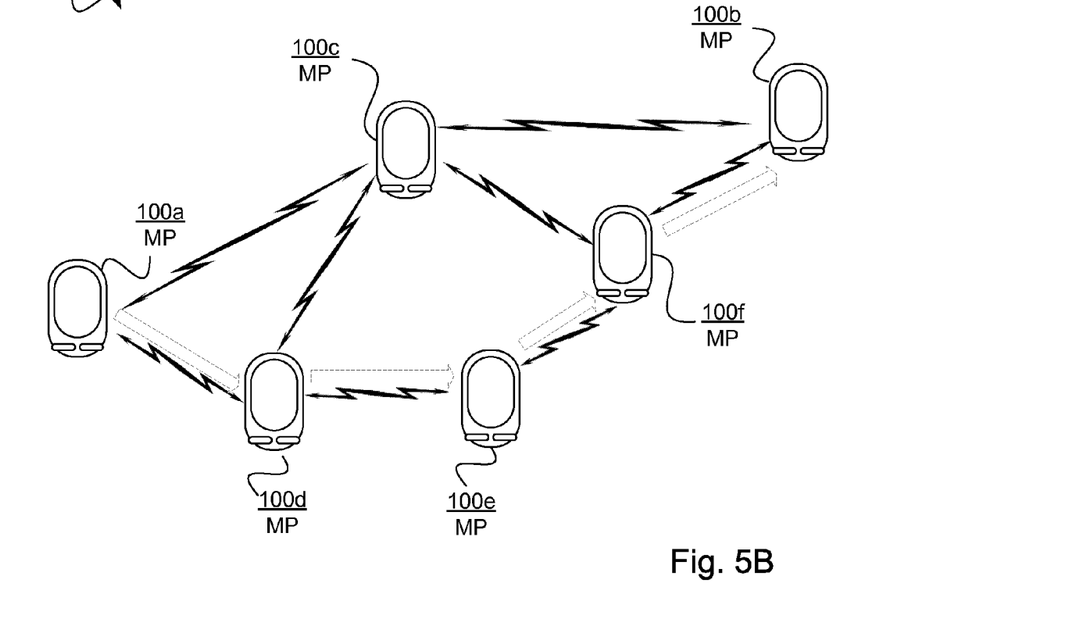

For voice applications we get for the cost C for a path between station A (such as station 100a in FIG. 5A) and station B (such as station 100b in FIG. 5A):

$C_{AB} = c_1 * f_1(\text{number of hops}_{AB}) + c_2 * f_2(\text{bitrate}_{AB}) + c_3 * f_3(\text{RSSI}_{AB}) + c_4 * f_4(\text{latency}_{AB}) + c_5 * f_5(\text{jitter}_{AB}) + c_6 * f_6(\text{packet loss}_{AB})$ Should the cost for a path, as in FIG. 5A, return a too high cost, the path from the first station 100a to the second station 100b, may be rerouted through other intermediate stations, such as in FIG. 5B, where the intermediate station 100c is no longer included in the path, but the traffic is routed through the intermediate stations 100d, 100e, 100f and 100g as is indicated by the dashed arrows.

As has been discussed above, the inventors of this application has realized after inventive and insightful reasoning that by adapting the transmitting power of a transmitting station, the interference in the mesh network as well as the battery drain is reduced, leading to a higher quality of service and also a longer life time of the stations involved. The transmitting power will thus be reduced in denser parts of the mesh network and increased in the more sparse areas of the mesh network.

Turning to the example of FIGS. 5A and 5B, the distance between the first station 100a and the intermediate station 100c (and also the distance between the intermediate station 100c and the second station 100b) is about double the distance between the intermediate stations 100d, 100e, 100f, 100g in the path of FIG. 5B. Transmitting a message through the path of FIG. 5A thus requires signal levels that are approximately 4 times as high as transmitting through the path of FIG. 5B. It is thus clear that the transmission in FIG. 5A will lead to more interference as well as a higher power consumption (for the individual station) than the transmission of FIG. 5B.

To adapt the transmitting power of a transmitting station, a receiving station monitors the received signal's strength, such as by determining the Received Signal Strength Indicator (RSSI). The RSSI may be determined as a floating average of received RSSIs.

If the RSSI falls below a threshold level (which may vary in time and from station to station), the connection might be broken and a new path has to be established.

A receiving station may thus be configured to try to make sure that a transmitting station is transmitting at a high enough power output to ensure that this does not happen.

The station may thus be configured to determine if the RSSI is close to the RSSI threshold and if so, signal to the transmitting station to increase its power output.

However, this may lead to that the transmitting power is unnecessarily high in the network as in the prior art.

The inventors therefore propose another solution to making sure that a connection is not broken by configuring the controller to determine if the RSSI is close to the threshold level ($RSSI_t$), possibly by determining that the RSSI is below a second threshold level, and if so signal for a new path request thereby effecting a soft handover proactively.

To avoid that a transmitting station is transmitting at a too high power level, the receiving station may be configured to determine that the RSSI is above a third threshold level and if so, send a request to the transmitting station to reduce its transmitting power. The request may indicate by how much the transmitting power should be reduced or the transmitting power may be reduced in increments.

In one embodiment the amount that the power should be reduced can be determined by comparing to a desired power level. For example, let us assume that for good VoIP (Voice over IP) quality the received signal strength should be in the target range between −60 dBm and −67 dBm. If we receive packets with an average RSSI value of −54 dBm we can then determine that the output power can be reduced by 6 dB.

Figure 6:
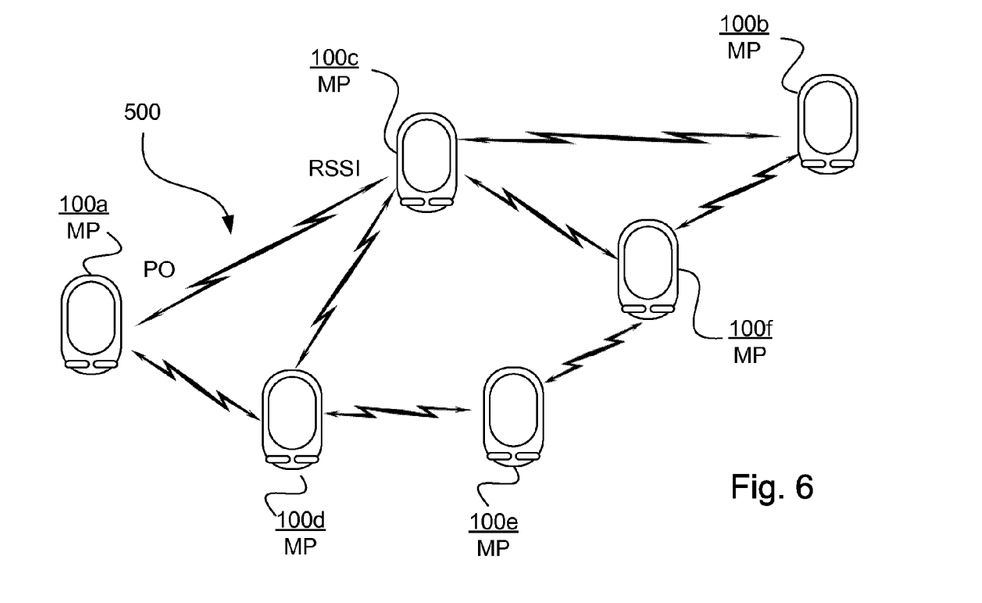
FIG. 6 shows an example of an example mesh network according to an embodiment of the teachings herein.
Figure 7:
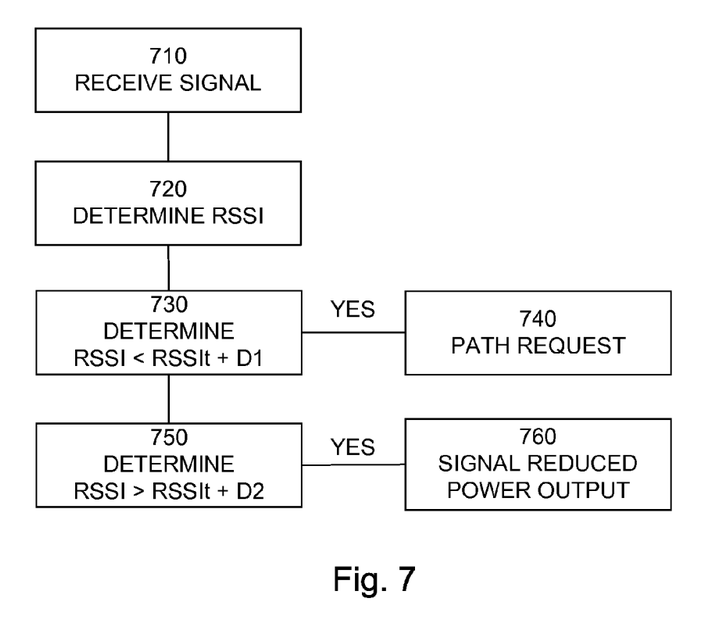
FIG. 7 is a flowchart of a general method according to an embodiment of the teachings herein.

FIG. 6 shows an example of a mesh network 500 where a first transmitting station 100a is transmitting at a power output PO to a receiving station 100c. FIG. 7 shows a flowchart of a general method according to this embodiment. The receiving station 100c receives the signal 710 and determines that the signal is received at a first signal strength RSSI 720. If the RSSI<RSSIt (the first threshold) the connection will break. The receiving station 100c is therefore configured to determine 730 if the RSSI<RSSIt+D1 (the second threshold) and if so, signal 740 for a new path request as the connection is about to be broken. The receiving station is also or alternatively configured to determine 750 if the RSSI>RSSIt+D2 (the third threshold) and if so, signal 760 to the transmitting station 100a to reduce its power output.

The inventors have also realized that in order to reduce the number of transmissions of requests between stations and also to be even more proactive in reducing the power level, the inventors propose a solution that takes into account the power level used when determining the path to be used. In this manner the most power conservative path will be chosen and there will be no need to adapt a path when others might have been better to start with. Such a cost function will be disclosed and discussed below, but it should be noted that once such a path has been selected, the path may be adapted according to the teachings above.

The inventors therefore propose to introduce a new metric function into the cost function which takes into account the transmitting power level of a transmitting station 100 when determining the cost of a path.

$$c_k * f_k(\text{transmitted power output}_{AB})$$

The transmitted power output may be received from the transmitting station 100a as part of the path request, or it may be specifically retrieved through a request. This will prioritize stations transmitting at a low power level.

The transmitting power output may also be approximated from the determined RSSI. This will deprioritize stations transmitting at too high a transmitting power.

In both cases a high transmitting power will lead to an increase in the cost for a path.

One example of such a metric function is $f(P)=2^{((P-30 \text{ dBm}))/3 \text{ dB}}$ where the output power $P \leq +30$ dBm.

In this manner, a proactive downsizing of the transmitting power of the stations in a mesh network is achieved as only stations using an adequate transmitting power will be selected to be included in a path. Furthermore, this also leads to a reduced interference.

The controller is thus configured to determine the cost by including a cost associated with the output power.

Figure 8:
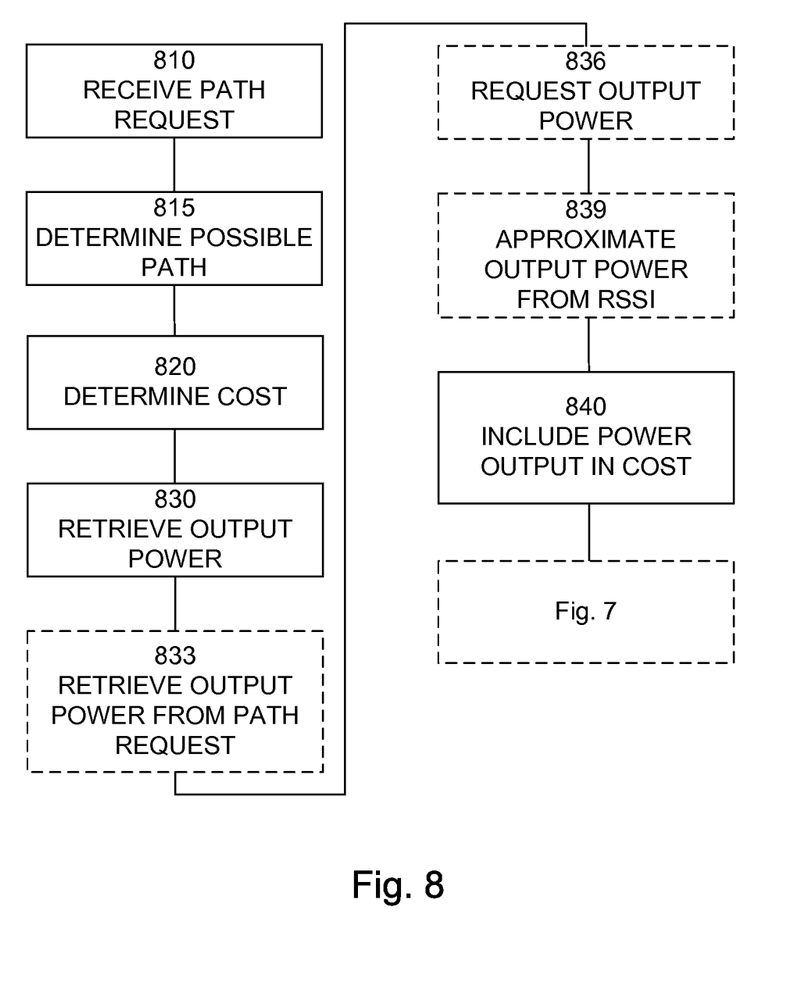
FIG. 8 is a flowchart of a general method according to an embodiment of the teachings herein.

FIG. 8 shows a flowchart of a general method according to the teachings herein for use in a mesh point (such as the stations 100 and 330 of FIGS. 1, 2, and 3).

A station 100 receives a path request 810 for a path from a first station 100a to a second station 100b and determines 815 a possible or proposed path and determines a cost 820 for the possible or proposed path. The station 100 retrieves 830 the power output of the transmitting station and includes 840 the power output in the determination of the cost for the path, wherein an increase in power output leads to an increase in cost.

The station 100 may also retrieve the power output as part of the path request 833 or by requesting it 836 from the transmitting station 100a. Alternatively, the station may approximate the output power as the received signal strength. In such an embodiment an increase in RSSI leads to an increase in cost if the RSSI is above a threshold, such as the third threshold. These manners of retrieving the power output are alternatives as are indicated by the dashed boxes in FIG. 8.

As the cost has been determined and a path has been requested, the station may be configured to operate as above to adapt the transmitting power of a transmitting station as disclosed with reference to FIGS. 6 and 7. This is an alternative as is indicated by the dashed box in FIG. 8.

By increasing the cost of the route or path, the intermediate station 100c may still be utilized however, to a lesser degree, in the mesh network. This leads to that a path between two end nodes is chosen in such a manner that the interference in the network is kept low and the power consumption of the stations is also kept low.

The novel cost function disclosed herein also has the benefit that the quality of service is increased in that the risk of a link failing is reduced by the proactive link management provided through the new cost function.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A station for use in a mesh network comprising at least one first station and a second station wherein the station comprises a controller configured to
   receive a path request for a path from the first station to the second station from a transmitting station;
   determine a proposed path between the first station and the second station; and
   determine a cost for the proposed path, wherein the controller is characterised in that it is configured to
   determine a received signal strength of the transmitting station;
   retrieve a power output level for the transmitting station as an approximation from the determined received signal strength;
   compare the received signal strength to a desired signal strength;
   determine that the received signal strength is below a second threshold level ($RSSI_t+D1$), and if so, signal for a path request to avoid the signal filling below a first threshold level (RSSIt) by signaling to the transmitting station to increase its power output thereby avoiding a break in the connection; and wherein the controller is further configured to include the power output level in the determination of the cost for the proposed path, wherein an increase in power output level leads to an increase in cost for the proposed path.

2. The station of claim 1, wherein said controller is further configured to retrieve the power output level from the path request.

3. The station claim 1, wherein said controller is further configured to retrieve the power output level from the transmitting station.

4. The station according to claim 3, wherein the controller is further configured to propagate the cost determined to another station as part of a path request.

5. The station according to claim 4, wherein the controller is further configured to select a proposed path having the lowest cost and to send a path response message to the first station including the selected proposed path having the lowest cost.

6. The station according to claim 5, wherein the station is a mobile communications terminal, such as a mobile phone, a laptop or a tablet computer.

7. A mesh network comprising a station, the station being for use in a mesh network comprising at least one first station and a second station wherein the station comprises a controller configured to
- receive a path request for a path from the first station to the second station from a transmitting station;
- determine a proposed path between the first station and the second station; and
- determine a cost for the proposed path, wherein the controller is characterized in that it is configured to
- determine a received signal strength of the transmitting station;
- retrieve a power output level for the transmitting station as an approximation from the determined received signal strength;
- compare the received signal strength to a desired signal strength;
- determine that the received signal strength is below a second threshold level $(RSSI_t+D1)$, and if so, signal for a path request to avoid the signal falling below a first threshold level (RSSIt) by signaling to the transmitting station to increase its power output thereby avoiding a break in the connection; and wherein the controller is further configured to include the power output level in the determination of the cost for the proposed path, wherein an increase in power output level leads to an increase in cost for the proposed path.

8. The mesh network according to claim 7, wherein said controller is further configured to retrieve the power output level from the path request.

9. The mesh network according to claim 7, wherein said controller is further configured to retrieve the power output level from the transmitting station.

10. The mesh network according to claim 9, wherein the controller is further configured to propagate the cost determined to another station as part of a path request.

11. The mesh network according to claim 10, wherein the controller is further configured to select a proposed path having the lowest cost and to send a path response message to the first station including the selected proposed path having the lowest cost.

12. A method for use in a station for use in a mesh network comprising at least one first station and a second station, wherein the method comprises:
- receiving a path request for a path from the first station to the second station;
- determining a proposed path between the first station and the second station; and
- determining a cost for the proposed path, wherein the method is characterized in that it further comprises
- determine a received signal strength of the transmitting station;
- retrieve a power output level for the transmitting station as an approximation from the determined received signal strength;
- compare the received signal strength to a desired signal strength;
- determine that the received signal strength is below a second threshold level $(RSSI_t+D1)$, and if so signal for a path request to avoid the signal falling below a first threshold level (RSSIt) by signaling to the transmitting station to increase its power output thereby avoiding a break in the connection; and
- include the power output level in the determination of the cost for the proposed path.

13. A receiving station use in a mesh network also comprising at least one transmitting station, wherein the receiving station comprises a controller configured to:
- receive a receive signal from the transmitting station; and
- determine a received signal strength of the signal, wherein the controller (210) is characterized in that it is configured to
- determine that the received signal strength is below a second threshold level $(RSSI_t+D1)$, and if so signal for a path request to avoid the signal falling below a first threshold level $(RSSI_t)$ thereby avoiding a break in the connection.

14. The station according to claim 13, wherein the controller is further configured to determine that the received signal strength is above a third threshold level $(RSSI_t+D2)$ and if so, send a request to the transmitting station to reduce its transmitting power.

15. The station according to claim 14, wherein the request to reduce transmitting power includes an indication on how much to reduce the transmitting power.

16. A method for use in a receiving station for use in a mesh network also comprising at least one transmitting station, wherein the method comprises:
- receiving a receive signal from the transmitting station; and
- determining a received signal strength of the signal, wherein the method is characterized in that it comprises
- determining that the received signal strength is below a second threshold level $(RSSI_t+D1)$, and if so signal for a path request to avoid the signal falling below a first threshold level $(RSSI_t)$ thereby avoiding a break in the connection.

17. A computer readable storage medium encoded with instructions that, when executed on a processor, performs a method for use in a station for use in a mesh network comprising at least one first station and a second station, wherein the method comprises:
- receiving a path request for a path from the first station to the second station;
- determining a proposed path between the first station and the second station; and
- determining a cost for the proposed path, wherein the method is characterized in that it further comprises
- determine a received signal strength of the transmitting station;
- retrieve a power output level for the transmitting station as an approximation from the determined received signal strength;
- compare the received signal strength to a desired signal strength;

determine that the received signal strength is below a second threshold level ($RSSI_t+D1$), and if so signal for a path request to avoid the signal falling below a first threshold level (RSSIt) by signaling to the transmitting station to increase its power output thereby avoiding a break in the connection; and include the power output level in the determination of the cost for the proposed path, wherein an increase in power output level leads to an increase in cost for the proposed path.

18. The computer readable storage medium of claim 17, wherein the method is used in a mesh network also comprising at least one transmitting station and a receiving station, wherein the receiving station comprises a controller configured to:

receive a receive signal from the transmitting station; and determine a received signal strength of the signal, wherein the controller is characterized in that it is configured to determine that the received signal strength is below a second threshold level ($RSSI_t+D1$), and if so signal for a path request to avoid the signal falling below a first threshold level ($RSSI_t$) thereby avoiding a break in the connection.

19. The computer readable storage medium of claim 18, wherein the controller is further configured to determine that the received signal strength is above a third threshold level ($RSSI_t+D2$) and if so, send a request to the transmitting station to reduce its transmitting power.

20. The computer readable storage medium of claim 19, wherein the request to reduce transmitting power includes an indication on how much to reduce the transmitting power.

21. The computer readable storage medium of claim 17, wherein the method is used in a mesh network also comprising at least one transmitting station, wherein the method comprises:

receiving a receive signal from the transmitting station; and determining a received signal strength of the signal, wherein the method is characterized in that it comprises determining that the received signal strength is below a second threshold level ($RSSI_t+D1$), and if so signal for a path request to avoid the signal falling below a first threshold level ($RSSI_t$) thereby avoiding a break in the connection.

* * * * *